US010726140B2

(12) United States Patent
Puvvada et al.

(10) Patent No.: US 10,726,140 B2
(45) Date of Patent: Jul. 28, 2020

(54) SYSTEM AND METHOD FOR CONFIGURATION MANAGEMENT DATABASE GOVERNANCE

(71) Applicant: ServiceNow, Inc., Santa Clara, CA (US)

(72) Inventors: Madhavi Puvvada, Sammamish, WA (US); Chinna Babu Polinati, Snoqualmie, WA (US); Davide Massarenti, Bothell, WA (US)

(73) Assignee: ServiceNow, Inc., Santa Clara, CA (US)

( * ) Notice: Subject to any disclaimer, the term of this patent is extended or adjusted under 35 U.S.C. 154(b) by 216 days.

(21) Appl. No.: 15/337,278

(22) Filed: Oct. 28, 2016

(65) Prior Publication Data

US 2018/0121486 A1 May 3, 2018

(51) Int. Cl.
*G06F 16/00* (2019.01)
*G06F 21/62* (2013.01)
(Continued)

(52) U.S. Cl.
CPC .......... *G06F 21/62* (2013.01); *G06F 16/2365* (2019.01); *G06F 21/604* (2013.01); *H04L 41/0856* (2013.01); *H04L 41/0866* (2013.01)

(58) Field of Classification Search
CPC .... G06F 16/2365; G06F 21/62; G06F 21/604; H04L 41/856; H04L 41/866
See application file for complete search history.

(56) References Cited

U.S. PATENT DOCUMENTS

| 2006/0161879 A1* | 7/2006 | Lubrecht | G06Q 10/06 |
| | | | 717/101 |
| 2007/0100712 A1* | 5/2007 | Kilpatrick | G06Q 10/06 |
| | | | 705/29 |

(Continued)

FOREIGN PATENT DOCUMENTS

CN 104503982 A 4/2015

OTHER PUBLICATIONS

Manage Engine, ServiceDesk Plus, Configuration Item Types (CI Types), CMDB-Configuration Item Types, Date Unknown, downloaded Oct. 17, 2016, https://www.manageengine.com/products/service-desk/help/adminguide/configurations/asset_management/configuration_itemtype.html, 5 pp.

(Continued)

*Primary Examiner* — Dinku W Gebresenbet
(74) *Attorney, Agent, or Firm* — Fletcher Yoder PC

(57) ABSTRACT

A method may include receiving a first record associated with a first configuration item from a first data source and a second record associated with a second configuration item from a second data source; identifying a relationship between the first configuration item and the second configuration item based on the first record and the second record; identifying a relationship rule governing the relationship between the first configuration item and the second configuration item; determining that the relationship between the first configuration item and the second configuration item is inconsistent with the relationship rule; remediating the relationship between the first configuration item and the second configuration item such that the relationship is consistent with the relationship rule; and allowing the first record and the second record to be stored in the configuration management database in response to remediating the relationship.

19 Claims, 7 Drawing Sheets

(51) Int. Cl.
    *H04L 12/24*     (2006.01)
    *G06F 21/60*     (2013.01)
    *G06F 16/23*     (2019.01)

(56) References Cited

U.S. PATENT DOCUMENTS

| | | | |
|---|---|---|---|
| 2010/0115100 A1 | 5/2010 | Tubman et al. | |
| 2011/0219437 A1* | 9/2011 | Ohkado | G06F 17/30 726/6 |
| 2014/0095343 A1* | 4/2014 | Daniel | G06Q 30/0621 705/26.5 |
| 2014/0280130 A1* | 9/2014 | Kumar | G06F 16/215 707/736 |
| 2017/0373935 A1* | 12/2017 | Subramanian | H04L 41/0889 |

OTHER PUBLICATIONS

IBM Knowledge Center, Configuring CI Relationship Rules, IBM Tivoli Live—Service Manager, Version 7.2.1.3, http://www.ibm.com/support/knowledgecenter/SVU13_7.2.1/com.ibm.ismsaas.doc/change/t_plan_AIA_rules.html, Date Unknown, downloaded Oct. 17, 2016, 1 p.

* cited by examiner

SYSTEM AND METHOD FOR CONFIGURATION MANAGEMENT DATABASE GOVERNANCE

TECHNICAL FIELD

This disclosure relates in general to techniques and devices for configuration management database governance.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Most individuals and organizations, such as businesses and governmental agencies, utilize computers on a daily basis to perform a variety of functions. These functions may include, for example, email, internet access, word processing, computer-aided design, media streaming, and many others. Indeed, individuals and organizations not only utilize their own computers to perform these functions, but since many of the functions are "cloud-based" most individuals and organizations utilize servers in data centers around the globe to perform many of these functions.

As organizations grow, the number of users and, thus, computers and associated devices, such as file servers, email servers, routers, etc., increase as well. Hence, many organizations utilize Information Technology Operations Management ("ITOM") tools to manage such systems. The ITOM tools may include policies, processes, and procedures to design and maintain the computers and associated functionalities for an organization. For example, ITOM tools may keep track of user computers and associated software, servers, routers, etc., within an organization so that administrators can determine when users have been added or removed, when equipment has been added, removed, or needs to be upgraded, when software needs to be updated, etc.

When dealing with individuals or small organizations, such tasks can be relatively straight forward and easy to perform. However, as organizations and their associated information technology ("IT") infrastructure grows, designing and maintaining such systems can be a difficult task. To facilitate the management of IT systems in such organizations, configuration management services are available to provide administrators a process by which a configuration management database ("CMDB") can be populated by configuration items ("CI") that represent components of the IT systems. Some of these configuration management services may be cloud-based where an ITOM service provider maintains one or more datacenters that can facilitate configuration management services within an organization's network or networks to perform such configuration management services, while other configuration management services may be performed "on-premises" by IT administrators utilizing configuration management software residing within the organization's computer network.

Regardless of the type of configuration management service utilized, the CMDB populated by the configuration management service may be utilized by IT administrators to design and maintain an organization's computer network. For example, using CIs stored in the CMDB by the configuration management service, an IT administrator can monitor the status of the hardware or software connected to provide a software service of the computer network. Such configuration management services may require that an IT administrator monitor CIs being populated in the CMDB by the configuration management service, for example, by validating that information associated with the CIs being populated in the CMDB is appropriate.

BRIEF DESCRIPTION OF THE DRAWINGS

The description herein makes reference to the accompanying drawings, wherein like reference numerals refer to like parts throughout the several views.

DETAILED DESCRIPTION

Figure 1:
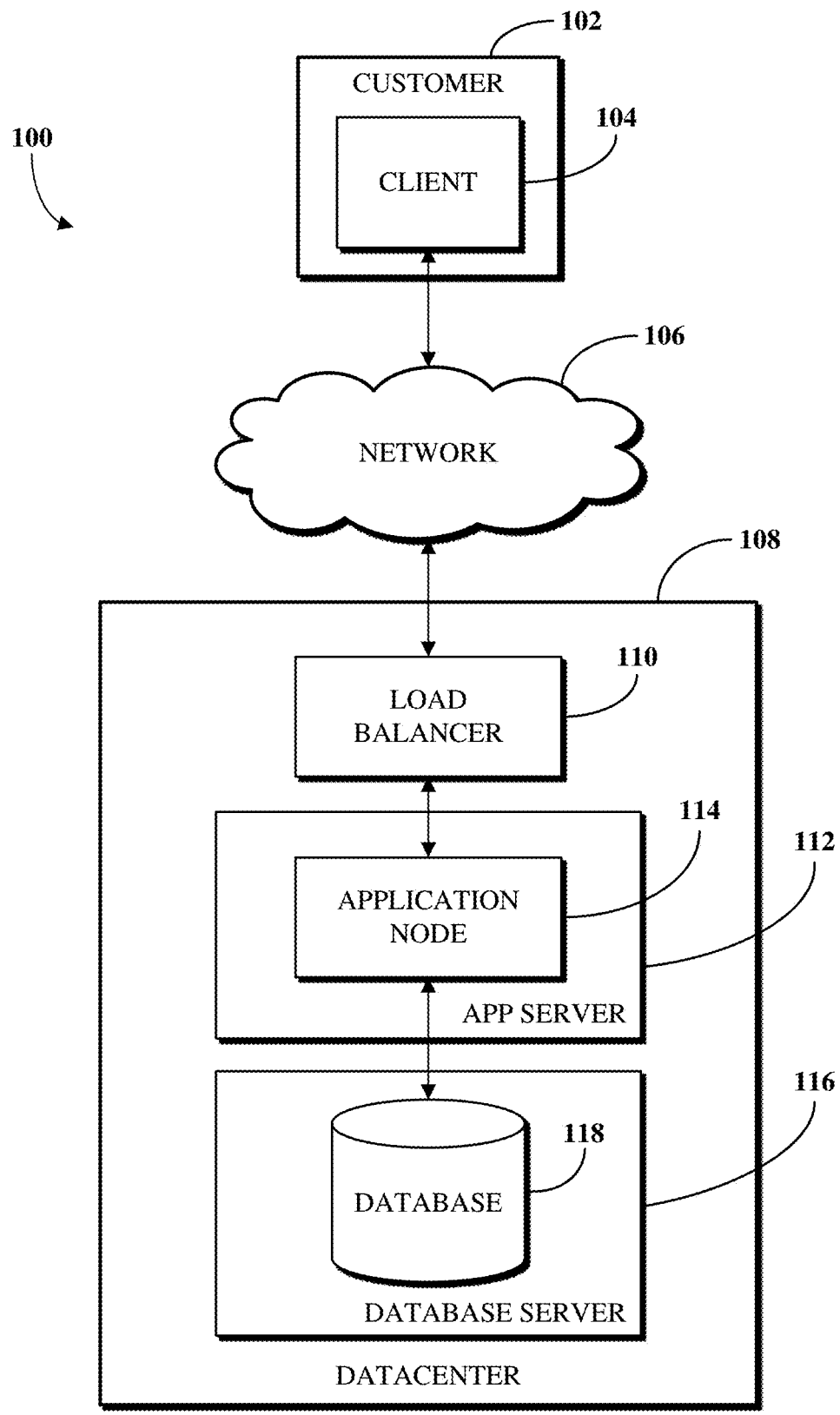
FIG. 1 is a block diagram of an example of an electronic computing and communications system.

Components associated with an electronic computing and communications system can be represented by configuration items ("CIs") in a configuration management database ("CMDB"). The CMDB can be, for example, implemented using database software used by platform software operating within a datacenter. The platform software can, for example, be part of a Platform-as-a-Service cloud computing environment. The platform software can, for example, use the CMDB to provide reports to users of the platform software of CIs stored in the CMDB, populate or update the CMDB based on input, such as from a discovery operation, an input file, or a user, integrate with an external application to provide CMDB data to the external application or receive changes to CMDB data from the external application, or combinations thereof.

A component can be any aspect of a computing and communications system or a subset thereof. For example, components can include software components (such as a web server instance, a database server instance, configuration files, or the like), hardware components (such as a server device, laptop device, router, switch, load balancer, or the like), or other types of components (such as a software license, service level agreement, or the like). A component can have one or more relationships with one or more other components. For example, a first component can reside (e.g., be hosted) on a second component. The first component can be represented by a first CI and the second component can be represented by a second CI in the CMDB. A relationship between the first component and the second component can be represented by metadata, such as attributes, associated with the first CI and the second CI. For example, the first CI can include an attribute that indicates that the first CI is hosted on the second CI and the second CI can include an attribute that indicates that the second CI hosts the first CI. Other types of relationships can be used, such as a connection relationship, a dependency relationship, a use relationship, a runs on relationship, a contained within relationship, or the like.

For example, a CMDB can be populated by a payload from one or more different data sources. For example, the one or more data sources can include a discovery application, a CMDB migration application, a user input application, other suitable data sources, or a combination thereof. Data included in a payload from the one or more different data sources can include data that does not meet, or is inconsistent with, desired standards for data entry into the CMDB. For example, a payload can include a plurality of CIs received from the data source. For example, a CMDB migration application can generate a payload by extracting CIs from a first CMDB and attempt to populate a second CMDB with the CIs associated with the payload. In some implementations, the payload can be stored in an import set including information about components. An import set can include a comma separated file, an Excel file, other suitable files, or combinations thereof.

In an example, a payload can include relationships between CIs that are inconsistent with a set of relationship rules associated with a CMDB receiving the payload. For example, the payload may be provided by a CMDB migration application that generates a payload by extracting CIs from another CMDB. In such a case, the other CMDB may not include a governance system and may not have relationship rules. Thus, the data in the other CMDB can differ (e.g., be inconsistent with) in a desired structure or content of data in the CMDB. Accordingly, if the CMDB is populated with CIs associated with such a payload, the relationships that are inconsistent with the desired structure or content of the CMDB can be stored in the CMDB. This can result in a CMDB that is, for example, not reliable or accurate.

An improved approach to populating a CMDB with CIs associated with a payload can include systems and techniques that monitor and control CIs being populated in the CMDB by a payload from the one or more data sources. The systems and techniques can limit CIs being stored in a CMDB to CIs having relationships that are consistent with the relationship rules. Such a CMDB can be provided by ServiceNow, Inc. of Santa Clara, Calif. Such systems and techniques can include determining whether a relationship between two CIs associated with the payload is consistent with a set of relationship rules. Based on the determination, the two CIs can be stored or not stored in the CMDB. For example, if the two CIs match or are consistent with a relationship rule, the CIs can be stored in the CMDB. If the two CIs do not match or are not consistent with a relationship rule, the CIs may be discarded and not stored in the CMDB. The matching, non-matching, or combinations thereof may be stored in a log. In other implementations, the systems and techniques can determine whether relationships associated with more than two CIs are consistent with a relationship rule. Based on the determination, the two or more Cis that are consistent with a relationship rule can be stored or not stored in the CMDB.

The systems and techniques can determine whether a relationship between two CIs previously stored in the CMDB is consistent with the relationship rules. The system can generate a notification indicating the relationship between the two CIs is inconsistent with the relationship rules when the system determines the relationship is inconsistent with the relationship rules. In some implementations, the notification can indicate a data source that is associated with the CIs having a relationship that is inconsistent with the relationship rules. For example, the data source can include the discovery application, the CMDB migration application, the user input application, other suitable data sources, or combinations thereof. A notification can include a message, such as an e-mail message or text message, a dialog box displayed on a client (e.g., the client 104 of FIG. 1), other suitable types of notifications or combinations thereof. The notification can be communicated to a user associated with the computing system 100.

Implementations of this disclosure provide technical improvements particular to computer networks, for example, those concerning CMDBs. Computer network-specific technical problems, such as incorrect CI relationships being stored in a CMDB, can be wholly or partially solved by implementations of this disclosure. For example, relationships that are inconsistent with relationship rules can be restricted from being stored in the CMDB. The implementations of this disclosure introduce new and efficient improvements in the ways in which CI relationships stores in the CMDB can be consistent with relationship rules by preventing a CI relationship from being stored in the CMDB unless the CI relationship is consistent with a corresponding relationship rule.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, a networked computing system, or the like.

The system 100 can include one or more customers 102. The customer 102 can be a public entity, a private entity, or other corporate entity or individual that purchases or otherwise uses services of a software provider, such as a software-as-a-service ("SaaS") provider or a platform-as-a-service ("PaaS") provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of an application running on a customer device associated with the customer 102. As used herein, the term "software" can include, but is not limited to, applications, programs, instances, processes, threads, services, plugins, patches, application version upgrades, or any other identifiable computing unit. The system 100 can include any number of customers or clients or can have a configuration of customers or clients different from that generally illustrated in FIG. 1. For example, and without limitation, the system 100 can include hundreds or thousands of customers and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

In some implementations, the client 104 and the servers associated with the datacenter 108 are configured to connect to, or communicate via, a network 106. A client 104 associated with the customer 102 may connect to the network 106 via a communal connection point, link, or path, and a client 104 associated with the customer 102 can connect to, or communicate via, the network 106 using a distinct connection point, link, or path. A connection point, link, or path can be wired, wireless, use other communications technologies, or a combination thereof.

The network 106 can include, for example, the Internet. In some implementations, the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communication traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Any number of application servers or database servers can be implemented at the datacenter 108. Further, the datacenter 108 can include servers other than or in addition to the application server 112 or the database server 116, for example, a web server.

The application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

In some implementations, the application server 112 can include any suitable number of application nodes, depending upon a system load or other characteristics associated with the application server 112. For example, and without limitation, the application server 112 can include two or more nodes forming a node cluster. The application nodes implemented on a single application server 112 can run on different hardware servers.

The database server 116 can be configured to store, manage, or otherwise provide data for delivering services to the client 104 over a network. In some implementations, the database server 116 includes a data storage unit, such as a database 118, which can be accessible by an application executed on the application node 114. In some implementations, the database 118 can be implemented as a relational database management system (RDBMS), an object database, an XML database, a configuration management database ("CMDB"), a management information base (MIB), one or more flat files, other suitable non-transient storage mechanisms, or a combination thereof. By way of non-limiting example, the system 100, can include an XML database and a CMDB. While limited examples are described, the database 118 can be configured as or comprise any suitable database type. Further, the system 100 can include one, two, three, or any suitable number of databases configured as or comprising any suitable database type or combination thereof.

The database 118 can be configured as a CMDB. A CMDB can include a plurality of configuration items (CIs), attributes associated with the CIs, or relationships between CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100 or subset thereof (e.g., of elements included within a computing environment of customer 102). In some implementations, an MIB can include one or more databases listing characteristics of the elements of the system 100. In some implementations, an object identifier (OID) can represent object identifiers of objects or elements in the MIB. One or more databases (e.g., the database 118), tables, other suitable information sources, or portions or combinations thereof can be stored, managed, or otherwise provided by one or more of the elements of the system 100 other than the database server 116, such as the client 104 or the application server 112.

Some or all of the systems and methods described herein can operate or be executed on or by the servers associated with the system 100. For example, an update for an application executed on the application node 114 can include updating or upgrading the database 118. In some implementations, the systems and methods described herein, portions thereof, or combinations thereof can be implemented on a single device, such as a single server, or a combination of devices, for example, a combination of the client 104, the application server 112, and the database server 116.

The system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

In some implementations, the network 106, one or more datacenters, such as the datacenter 108, and one or more load balancers, such as the load balancer 110, can be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., such as an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. In some implementations, the secondary database can include an exact or substantially exact mirror, copy, or replication of the primary database. The primary database or the secondary database can be implemented as a relational database management system (RDBMS), an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

In some implementations, a distributed computing system can allocate resources of a computer network using a multi-tenant or single-tenant architecture. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. In some implementations, customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
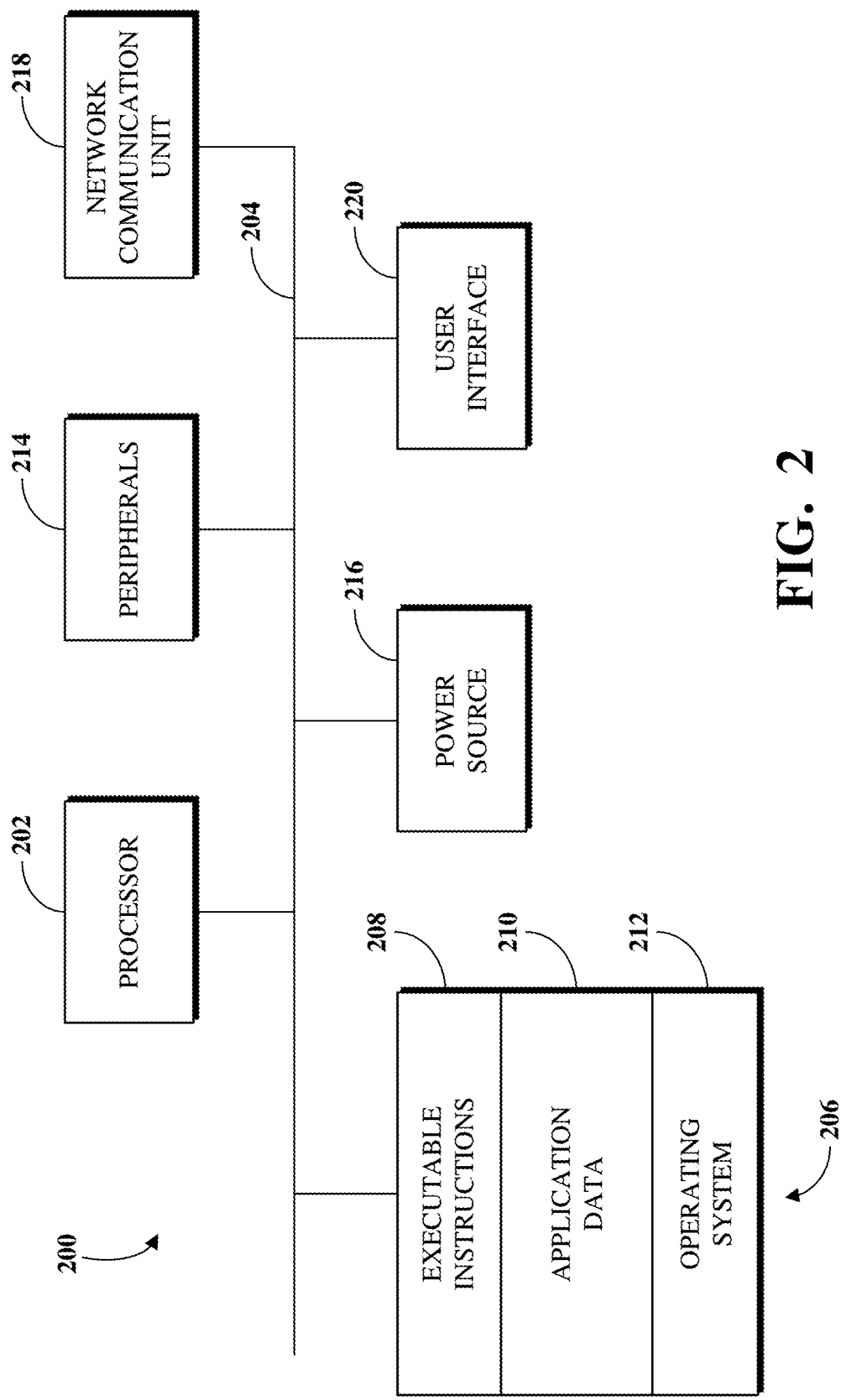
FIG. 2 is a block diagram of an example of an internal configuration of a computing device of the electronic computing and communications system shown in FIG. 1.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof. The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions. The operations of the processor 202 can be distributed across multiple clients or servers, which can be coupled directly or across a local area or other suitable type of network.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a computing device 200 can include volatile memory, such as RAM, and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to govern CMDB data. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, or an operating system for a small device, such as a smartphone or tablet device; or an operating system for a large device, such as a mainframe computer. The memory 206 can comprise one or more devices and can utilize one or more types of storage, such as solid state or magnetic storage. The memory 206 can be distributed across multiple clients or servers, such as network-based memory or memory in multiple clients or servers performing the operations of clients or servers.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. The user interface 220 can include a display, which can be a liquid crystal display (LCD), a cathode-ray tube (CRT), a light emitting diode (LED) display, (e.g., an OLED display), or other suitable display. Although depicted here as a single bus, the bus 204 can be composed of multiple buses, which can be connected to one another through various bridges, controllers, or adapters.

Figure 3:
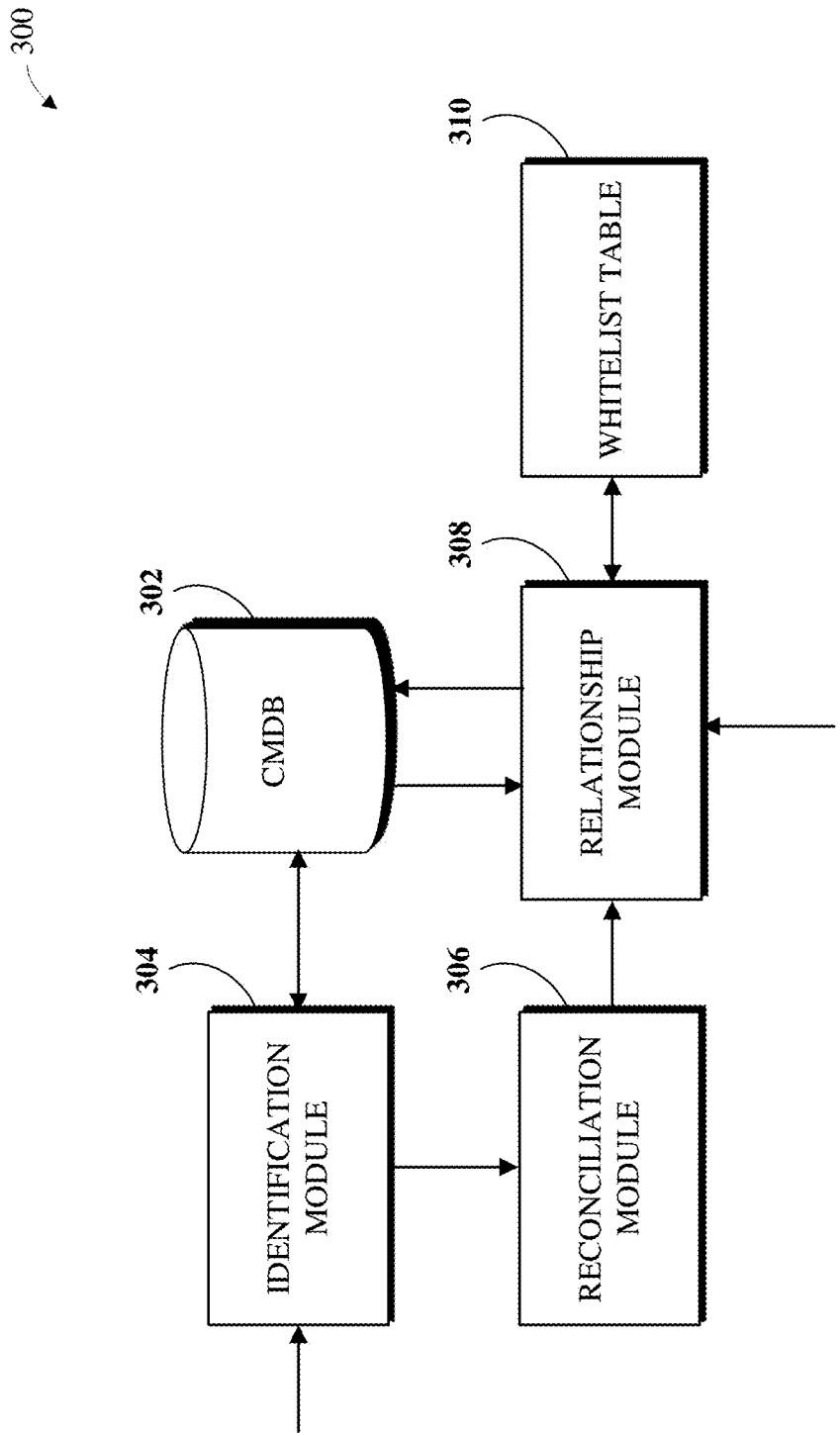
FIG. 3 is a block diagram of an example of a configuration management database governance system.

FIG. 3 is a block diagram of an example of a configuration management database ("CMDB") governance system 300 ("system 300"). The system 300 can include a CMDB 302, an identification module 304, a reconciliation module 306, a relationship module 308, a whitelist table 310, or combinations thereof. System 300 can, for example, be implemented using an implementation of the electronic computing and communications system 100 of FIG. 1 or one or more implementations of computing devices 200 of FIG. 2. For example, CMDB 302, whitelist table 310, and modules 304, 306, and 308 can be implemented using application node 114, database 118, or combinations thereof. The system 300 can be implemented as part of platform software running on a datacenter, such as the datacenter 108. The platform software can be part of a Platform-as-a-Service (PaaS) which can be provided, for example using datacenter 108 of the computing system 100. In some examples, the modules of system 300 can be part of or associated with the platform software (e.g., software components associated with the platform software), scripts stored on the datacenter 108 that are executed by the platform software, or combinations thereof. For example, the relationship module 308 can be implemented using a script stored in database 118 and executed by application node 114. As another example, the relationship module 308 can be implemented using Java, C, or a similar programming language, that can be compiled or interpreted and included in or associated with the platform software. The platform software, in response to a data source attempting to make changes to the CMDB 302, can execute the modules of system 300 such as relationship module 308.

The system 300 can be configured to govern data associated with a CMDB. CMDB governance relates to the processing of CIs based on CI relationships to, for example, prevent CIs with incorrect relationships from being stored in the CMDB. An administrator or other user of the computing system 100 may not know whether data in a CMDB is accurate, reliable, or can be trusted. Data stored in the CMDB can become stale or unreliable over time due to practices and processes that allow for undesirable relationships between CIs to be entered into the CMDB. The system 300 can be configured to prevent CIs and CI relationships from being stored in the CMDB that are undesirable or that are inconsistent with a set of CIs or CI relationship rules. By governing the CIs and CI relationships being stored in the CMDB, the system 300 may be able to provide a higher quality CMDB with more accurate data.

The CMDB 302 can be implemented using, for example, a relational database and can store a plurality of configuration items (CIs), relationships between the CIs, other suitable information, or combinations thereof. A CI can include a record that represents a component of the system 100, for example, components located within a computing environment of customer 102. For example, servers, clients, networks, load balancers, application nodes, databases, other components, associated with the system 100 can be represented by a CI record in the CMDB. A CI record can include a CI type. For example, CI record representing a Windows server can include a server CI type, while a CI record representing a software application can include an application CI type. A CI record can include an identification number, configuration information for the component associated with the CI, attributes associated with the CI, other suitable information, or combinations thereof.

As mentioned above, the CMDB 302 can include information about relationships between CIs. For example, the CMDB 302 can include a relationship table that includes records that include information about relationships between CIs. In another example, a CI record can include an attribute that includes information about a relationship between a component associated with the CI and another component associated with another CI. For example, the CMDB 302 can include a first CI and a second CI. The first CI can represent a first component associated with the computing system 100 and the second CI can represent a second CI associated with the computing system 100. The first CI can have a relationship with the second CI. For example, the first component can be a webserver application and the second component can be a server (e.g., a server device). The webserver application (e.g., the first component) can be hosted by the server (e.g., the second component). The first CI (e.g., representing the webserver application) can include an attribute that indicates the first CI is hosted on the second CI and the second CI (e.g., representing the server) can include an attribute that indicates that the second CI hosts the first CI.

A CI can include a CI type. For example, the first CI can include a first CI type and the second CI can a second CI type. In the example above, the first CI can represent a webserver application component and the second CI can represent a server component. A CI type associated with the webserver application component can include an application CI type and a CI type associated with the server component can include a server CI type.

CI records can be added to the CMDB 302 by one of a plurality of data sources. These data sources may include CIs with relationships that are not desired in the CMDB. The plurality of data sources can include a discovery application, a CMDB migration application, a user input application, other suitable sources of CI data, or combinations thereof. In some implementations, a data source can provide a payload to the CMDB 302. A payload can include a plurality of CI records. As described above, the CI records can include a CI type, an attribute including information about a relationship associated with the CI, other suitable information, or combinations thereof.

The plurality of data sources can be configured to populate the CMDB 302 with CIs that represent components associated with a computing system, such as described above. For example, a data source can provide a payload to the CMDB 302. In some implementations, the payload can be stored in an import set. An import set can include a comma separated file, an Excel file, other suitable files, or combinations thereof. The payload can include one or more CIs, CI attributes, relationships between the CIs, other suitable information, or combinations thereof. The CIs, CI attributes, relationships between the CIs, other suitable information, or combinations thereof can be stored in the CMDB 302.

A data source can include a discovery application which can perform a discovery process to identify CIs associated with a computer system, such as components of a computer network of customer 102. The discovery process can probe components of the computer system to identify computers and other devices connected to the computer system. When the discovery process identifies a computer or other device, the discovery process can probe the identified computer or other device's configuration, provision, current status, attributes, or other suitable information associated with the identified computer or other device. In some implementations, the discovery application can generate a payload that includes one or more CIs, CI attributes, relationships between the CIs, other suitable information about components of the computer system, or combinations thereof. The discovery application can use the payload to update the CMDB 302.

In some implementations, the discovery application can perform a horizontal discovery process. A horizontal discovery process can include scanning internet protocol (IP) addresses associated with components of a computer system. The discovery application can then log into a component associated with an IP address and gather hardware and software information associated with the component.

In some implementations, the discovery application can perform a top-down discovery process. A top-down discovery process can include receiving an entry point. An entry point can be, for example, a URL that indicates how to access an application provided by a computer system. The discovery application can access the entry point. For example, the discovery application can use login credentials to log into a component associated with the entry point. The discovery application can gather information about the entry point and a component associated with the entry point. For example, the discovery application can access a configuration file associated with the component to identify a name of the entry point or component, an application or component type associated with the entry point or component, identify entry points to components that the entry point or its associated component communicates with, other suitable information, or combinations thereof.

The discovery application can generate a payload, such as described above. The payload can include a CI or CIs that represent the information associated with the entry point or the component associated with the entry point. The discovery application can then identify and access entry points or components used by the component associated with the entry point. The discovery application can repeat the steps above and continue to discover information about successive layers of entry points and components until the discovery process cannot identify additional entry points. The discovery application can update the payload to include CIs that represent information associated with the identified components associated with the entry point including relationships between the components associated with the entry point. The discovery application can be configured to populate the CMDB 302 with data associated with the payload.

A data source can also include a CMDB migration application. A CMDB migration application can perform a CMDB migration process. A CMDB migration application can be used to migrate data, such as CIs, CI attributes, relationships between CIs, other suitable data, or combinations thereof, from a first CMDB to a second CMDB. For example, an administrator associated with the computing system 100 can use the CMDB migration application to migrate from a third party CMDB (e.g., a CMDB associated with another computing system) to a CMDB associated with the computing system 100, such as the CMDB 302. In another example, the administrator can use the CMDB migration application to migrate from an existing CMDB associated with the computing system 100 to a new CMDB associated with the computing system 100. It should be understood that the CMDB migration application can be used to migrate data from a CMDB for other suitable reasons than those described herein.

The CMDB migration application can be configured to extract data associated with a first CMDB. For example, the CMDB migration application can extract CIs, CI attributes, data associated with relationships between the CIs, other suitable data, or combinations thereof, from the first CMDB. The CMDB migration application can generate a payload that includes the data extracted from the first CMDB. The CMDB migration application can be configured to populate the CMDB 302 with data associated with the payload.

A CMDB 302 can also be integrated with a third-party application. For example, such an integration may include importing information from a third-party system that may have information about CIs in the CMDB 302 that have not yet been included in CMDB 302, such as through a discovery process. For example, such an integration may include adding CIs based on the information in the third-party system, which may or may not be a CMDB. Accordingly, relationships between CIs being imported by the third-party system may be inconsistent with the relationship rules associated with the whitelist table 310. Accordingly, in integration implementations, system 300 can be utilized to govern the data provided by the integration to prevent inconsistent or incorrect data from being stored in CMDB 302. As mentioned above, a data source can include data obtained using a user input application. For example, an administrator associated with the computing system 100 can access the CMDB 302 via a user interface, such as the user interface 220 of FIG. 2. In such an implementation, user interface 220 can be configured to display, for example, a rendering of a web page provided to client 104, such as by application node 114, which can include user interface elements including information about CMDB 302 or for receiving input that can be used to effect change (e.g., editing, adding to, or deleting from) in CMDB 302. For example, the administrator can be provided an interface to manually add CI records in the CMDB 302. For example, the administrator can add CIs, CI attributes, relationships between CIs, other suitable data associated with a CI record, or combinations thereof. For example, the input received using a user interface (e.g., of client 104) can be transmitted to, e.g., an application node 114 which can use a processor of the application node (e.g., such as processor 202) to generate a payload that includes CIs, CI attributes, relationships between the CIs, other suitable data associated with a CI record, or combinations thereof. The data associated with the payload can be used to populate the CMDB 302.

Because of the potential for errors due to the variety of data sources described above, the system 300 can limit CIs being stored in the CMDB 302 to unique CIs. For example, as described above, a data source can populate the CMDB 302 with CIs associated with a payload. The payload can include a plurality of CIs and other suitable information associated with the CIs. The system 300 can be configured to determine whether a CI associated with the payload is a unique CI. A unique CI can include a CI that does not already exist in the CMDB 302, a CI that exists in the CMDB 302 and includes at least one attribute that is different from the CI in the CMDB 302, other suitable unique CIs, or combinations thereof.

The identification module 304 can be configured to determine whether a CI associated with the payload is a unique CI. The identification module 304 can use a set of identification rules in order to determine whether a CI is a unique CI. For example, the identification module 304 can receive a first CI associated with a payload associated with a data source, as described above. The identification module 304 can use the identification rules to uniquely identify CIs in the CMDB. The identification rules can include identification information that specify attributes that unique identify a CI in the CMDB. The identification rules can be stored in an identification rules table. The identification module 304 can access the CMDB 302 to retrieve records associated with the first CI. For example, the identification module 304 can retrieve CIs that have a similar CI type as the first CI, retrieve CIs that are on a similar domain as the first CI, other suitable CIs, or combinations thereof. The identification module 304 compares the first CI and attributes associated with the first CI to CIs and attributes associated with the CIs retrieved from the CMDB 302. When the identification module 304 determines a CI stored in the CMDB 302 matches (e.g., is identical) the first CI, the identification module 304 determines the first CI is not unique (e.g., the first CI already stored or represented in the CMDB 302) and can disregard the CI.

The identification module 304 can perform a de-duplication process. The de-duplication process can group duplicate (e.g., not unique) CIs. The identification module 304 can review the duplicate CIs and determine whether to reclassify one or more of the duplicate CIs. The identification module 304 can apply the identification rules to the duplicate CIs to determine whether the duplicate CIs should be stored in the CMDB 302. For example, the identification module 304 can verify that a CI identified as duplicate is actually a duplicate CI by applying the identification rules to the CI. In some implementations, the identification module 304 can reclassify a duplicate CI. For example, the identification module 304 can upgrade, downgrade, or change a class associated with the duplicate CI.

When the identification module 304 determines a CI stored in the CMDB 302 is similar to the first CI, the identification module 304 can use a set of identification rules to determine whether the first CI is unique. For example, the identification rules can include one or more rules that define whether a CI is unique based on attribute differences between the CI and a CI stored in the CMDB 302. For example, the first CI can include a first attribute and second attribute and a CI stored in the CMDB 302 can be similar to the first CI and include the first attribute and a third attribute. The identification rules can be used to determine whether the first CI matches a CI already in the CMDB. When the identification module 304 determines, based on the identification rules, that the first CI is does not match a CI in the CMDB, the identification module 304 communicates the first CI to the reconciliation module 306. When the identification module 304 determines, based on the identification rules, that the first CI does match a CI already in the CMDB (e.g., the identification rules can specify to update attributes of the CI stored in the CMDB 302 rather than create a new CI), the identification module 304 can communicate the first CI to the reconciliation module 306 and include instructions to update the CI record stored in the CMDB 302 to reflect the attributes associated with the first CI. The identification module 304 can iteratively continue determining whether CIs associated with the payload match CIs already in the CMDB.

The reconciliation module 306 can be configured to determine whether CIs received from the identification module 304 (e.g., identified as being unique) come from an authoritative data source. The reconciliation module 306 can use reconciliation rules stored in a reconciliation rules table to determine whether a CI is associated with an authoritative data source. The reconciliation rules can include a data source and one or more actions the data source has authority to take on CI records in the CMDB 302. Some data sources can be more reliable or can provide more reliable data than other data sources. Such data sources can, accordingly, have authorization to update the CMDB. For example, the discovery application data source can have authorization to store CIs in the CMDB 302 because the discovery application data source is reliable source of CI data. For example, a first record can include the discovery application data source. In some implementations, the discovery application data source can have authority to make any change to the CMDB 302 (e.g., can create a new CI, can edit a CI record, can delete a CI record, other suitable actions, or combinations thereof). The record associated with the discovery application data source can indicate that the discovery application data source has authority to make any change to the CMDB 302. A second record can include the CMDB migration application data source. In some implementations, the CMDB migration application data source can have authority to create new CIs and edit existing CI records. However, in some implementations, the CMDB migration application can be restricted from removing or deleting a CI record from the CMDB 302.

The reconciliation rules can specify CI types that a data source has authority to store in the CMDB 302. As described above, a CI can include a CI type corresponding to the type of component that is represented by the CI (e.g., a CI representing a software application can have an application CI type). In some implementations, a reconciliation rule can include the discovery application data source. The discovery application data source can have authority to store all CI types associated with a CI to the CMDB 302. In another example, a reconciliation rule can include another data source. The other data source can have authority to store CIs having a storage device CI type. Accordingly, a CI having a CI type other than storage device CI type and is associated with the other data source, will not be permitted to be stored in the CMDB 302. In another example, a data source can be permitted to update a CI created or updated by a more authoritative data source only if the current time is greater than a threshold time from when the CI was created or updated by the more authoritative data source (e.g., the existing data for the CI in the CMDB is stale and has not been updated for seven or some other number of days).

In some implementations, the reconciliation module 306 can determine whether a first CI received from the identification module 304 is associated with an authoritative data source by identifying reconciliation rules having a data source corresponding to the data source associated with the first CI. When the reconciliation module 306 does not identify a reconciliation rule corresponding to the data source (e.g., the data source is not represented in the reconciliation rules), the reconciliation module 306 can determine the data source is not an authoritative data source and can disregard the first CI. The reconciliation module 306 can be configured to generate a notification indicating that the first CI was disregarded (e.g., not stored in the CMDB 302) because the data source does not have authority to store the first CI in the CMDB 302 (such as by sending a notification to client 104).

When the reconciliation module 306 identifies at least one reconciliation rule having a data source corresponding to the data source associated with the first CI, the reconciliation module 306 determines whether the data source has authority to store the first CI in the CMDB 302 based the identified record. For example, as described above, the record can include CI types that a data source associated with the record has authority to store in the CMDB 302 (e.g., the data source can store CIs having CI types corresponding to the CI types defined in the record).

The reconciliation module 306 can determine a CI type associated with the first CI. The reconciliation module 306 can determine whether the CI type associated with the first CI is included in the record corresponding to the data source. When the reconciliation module 306 determines the CI type is included in the record corresponding to the data source, the reconciliation module 306 can communicate the first CI to the relationship module 308. When the reconciliation module 306 determines the CI type is not included in the record associated with the data source (e.g., the data source has authority to store CIs in the CMDB 302, but not CIs have the CI type associated with the first CI), the reconciliation module 306 can generate a notification as described above. It should be understood that the reconciliation rules can include other suitable rules in addition to those described herein. Further, the reconciliation module 306 can use suitable techniques other than those described herein to determine whether a data source has authority to modify the CMDB 302 according to a CI associated with the payload.

The system 300 can limit CIs being stored in the CMDB 302 to CIs having associated relationships that are consistent with at least one relationship rule associated with a set of relationship rules. A relationship rule can include information that defines a CI relationship (e.g., a relationship between two CI types) that can be allowable and, accordingly, can be stored in the CMDB 302. A relationship can be consistent with a relationship rule when, for example, the relationship adheres to the rule, does not violate the rule, includes required aspects of the rule, or the like. Conversely, a relationship can be inconsistent with a relationship rule when the relationship does not adhere to the rule, violates the rule, or omits required aspects of the rule. When the relationship is not consistent with at least one relationship rule associated with the set of relationship rules, the relationship is considered to be an inconsistent relationship (e.g., the relationship is inconsistent with the set of relationship rules).

An inconsistent relationship that does not satisfy the relationship rules can include those that are nonsensical for the related CIs. For example, a relationship that specifies that a web application contains a web server is a nonsensical relationship because a web application would be included within a web server, not the other way around. Other nonsensical relationships could include, for example, a web application configuration file included in a network switch, a laptop device included in a server device, or the like. As illustrated, nonsensical relationships can include those relationships that are not possible, are highly unlikely, or are undesired in the system 300 and/or the CMDB 302. The system 300 can be configured to prevent known nonsensical relationships or other relationships that are inconsistent with the desired operation of the CMDB.

The relationship module 308 can receive a plurality of CIs from the reconciliation module 306. The plurality of CIs can include CIs that the identification module 304 identified as being unique and that the reconciliation module 306 identified as being associated with a data source having authority to store respective CIs of the plurality of CIs in the CMDB 302.

The relationship module 308 can be configured to determine whether a relationship between CIs associated with the plurality of CIs is consistent with the set of relationship rules. For example, the relationship module 308 can be configured to determine whether a relationship between two CIs is consistent with the relationship rules. In another example, the relationship module 308 can be configured to determine whether relationships between more than two (e.g., three or more) CIs are consistent with the set of relationship rules. In some implementations, the set of relationship rules can correspond to relationship records stored in the whitelist table 310. A relationship record can include one or more rule CI types and one or more rule relationship types. A rule relationship type can correspond to an allowable (e.g., desired or standard) relationship between rule CI types associated with the relationship rule. In one example, a relationship record can include a first rule CI type, a second rule CI type, and a rule relationship type. The rule relationship type can correspond to an allowable relationship between a CI having a CI type corresponding to the first rule CI type and a CI having a CI type corresponding to the second rule CI type.

In some implementations, a relationship rule can include hosting rules, containment rules, connection rules, dependency rules, use rules, a runs on relationship, a contained within relationship, or other suitable rules. A hosting rule can represent an allowable hosting relationship between the rule CI types associated with a corresponding relationship record. In such a case, the rule relationship type, associated with the relationship record, can be a hosting relationship. For example, an application software CI type can be run on a hardware CI type. A containment rule can represent an allowable containment relationship between the rule CI types associated with a corresponding relationship record. In such a case, the rule relationship type, associated with the relationship record, can be a containment relationship. For example, a web service CI type can contain a file CI type. A dependency rule can include other combinations of CIs and relationships that belong together. For example, a dependency rule can include a dependency between a web server CI type and a CI database type and a dependency relationship. For example, a web server may be dependent upon a database server. In such a case, the rule relationship type, associated with a respective relationship record, can be a dependency relationship or a uses relationship. A connection rule can represent an allowable connection relationship between the rule CI types associated with a corresponding relationship record. In such a case, the rule relationship type, associated with the relationship record, can be a connection relationship. For example, a server CI type can have a network connection with a communications CI type (e.g., a CI type associated with a network switch CI). A use rule can represent an allowable use relationship between the rule CI types associated with a corresponding relationship record. In such a case, the rule relationship type, associated with the relationship record, can be a use relationship. For example, a hardware CI type can be used by a software CI type.

Figure 4:
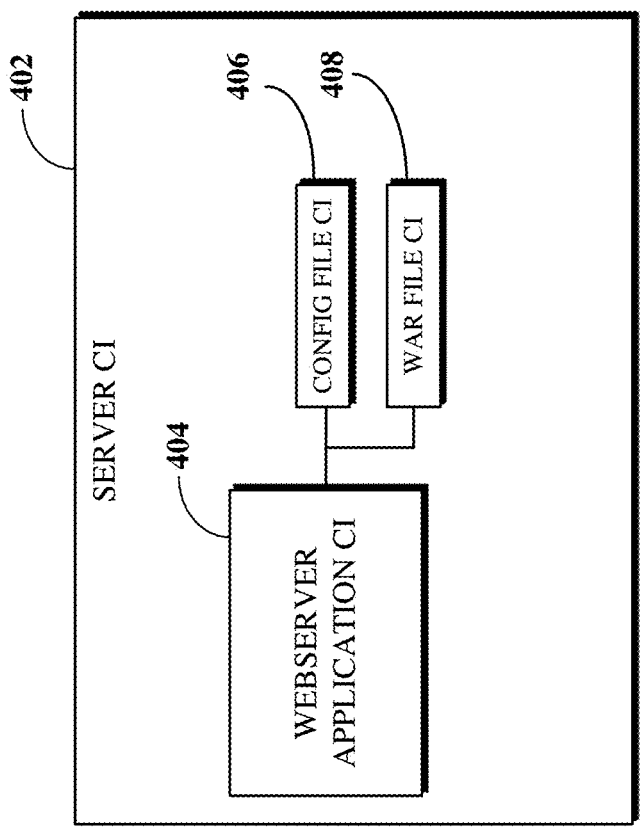
FIG. 4 illustrates an example of related configuration items.

FIG. 4 illustrates example CIs that can have a hosting or a containment relationship. For example, a server CI 402 can host a webserver application CI 404. A CI type associated with server CI 402 can include a server CI type and a CI type associated with the webserver application CI 404 can include an application CI type. The server CI 402 can include a relationship attribute that indicates the server CI 402 hosts the webserver application CI 404. Similarly, the webserver application CI can include a relationship attribute that indicates the webserver application CI is hosted by the server CI 402.

In another example, the webserver application CI 404 can have a containment relationship with a configuration file CI 406 and a web application archive ("WAR") file CI 408. In some implementations, a CI type associated with the configuration file CI 406 and the WAR file CI 408 can include a file CI type. The webserver application CI 404 can include a relationship attribute indicating that the webserver application CI 404 contains the configuration file CI 406 and the WAR file CI 408. Similarly, the configuration file CI 406 can include a relationship attribute that indicates the configuration file CI 406 is contained by the webserver application CI 404 and the WAR file CI 408 can include a relationship attribute that indicates the WAR file CI 408 is contained by the webserver application CI 404. It should be understood that while limited examples are described, the plurality of CIs can include other types of relationships than those described herein and can have more or less complex relationships than those described herein.

The relationship module 308 can receive CIs associated with the plurality of CIs, for example, a first CI and a second CI. In another example, the relationship module 308 can receive more than two CIs. The relationship module 308 can identified a first CI type associated with the first CI and a second CI type associated with the second CI. The relationship module 308 can determine a relationship between the first CI and the second CI based on a first relationship attribute associated with the first CI and a second relationship attribute associated with the second CI.

The relationship module 308 can identify relationship records stored in the whitelist table 310 having a first rule CI type corresponding to the first CI type and a second rule CI type corresponding to the second CI type. When the relationship module 308 does not identify a relationship record having both a rule CI type corresponding to the first CI type and a rule CI type corresponding to the second CI type, the relationship module 308 can be configured to not allow the first CI and the second CI to be stored in the CMDB 302. The relationship module 308 can generate a notification indicating that a relationship between the first CI and the second CI is inconsistent with relationship rules associated the CMDB 302 (e.g., because no record exists in the whitelist table 310 that includes the first rule CI type and second rule CI type, the first CI and the second CI cannot be related in a way that is consistent with the relationship rules). The relationship module 308 can use the user interface 220 to notify an administrator associated with the computing system 100, as described above.

When the relationship module 308 identifies a relationship record that includes a rule CI type (e.g., a first rule CI type) corresponding to the first CI type and a rule CI type (e.g., a second rule CI type) corresponding to the second CI type, the relationship module 308 compares the relationship between the first CI and the second CI with a rule relationship type associated with the identified relationship record. When the relationship module 308 determines the relationship between the first CI and the second CI is consistent with the relationship rule (e.g., follows the relationship rule because the first CI type is consistent with the first rule CI type, the second CI type is consistent with the second rule CI type, and the relationship is consistent with the rule relationship type), the relationship module 308 allows the first CI and the second CI to be stored in the CMDB 302. In some implementations, the relationship module 308 can be configured to store CIs in the CMDB 302. In other implementations, the relationship module 308 can communicate CIs to be stored in the CMDB 302 to a CMDB persistence application or module (not shown). The CMDB persistence application or module can store CIs received from the relationship module 308 in the CMDB 302.

The relationship module 308 can identify more than one relationship record in the whitelist table 310 that includes a rule CI type corresponding to the first CI type and a rule CI type corresponding to the second CI type. The relationship module 308 can compare a relationship associated with the first CI and the second CI with rule relationship types associated with the more than one identified relationship records. If the relationship module 308 determines that the relationship is not consistent with any of the rule relationship types associated with the identified relationship records, the relationship module 308 generates the notification as described above. When the relationship module 308 determines the relationship type is consistent with a rule relationship type associated with an identified relationship record, the relationship module 308 can allow the first CI and the second CI to be stored in the CMDB 302.

It should be understood that while an example of two CIs is used in the preceding description, the relationship module 308 can be configured to determine whether relationships between any suitable number (e.g., three, four, five, or more) CIs are consistent with the set of relationship rules and some of the relationship records may include more than two CIs In addition, while the preceding description describes that the CI types of CIs are matched to rule CI types before relationship types are matched, the matching of the attributes of the CIs and the requirements of the relationship rules can be done in other orders or sequences.

Determining whether CIs are consistent with a relationship rule can include determining whether the direction of the relationship between the CIs matches the rule. For example, in the case of a server device CI and a web server instance CI, the web server instance CI is properly hosted by the server device CI (and not the other way around). The CIs can have a relationship that has a directional relationship type indicative of the direction of the relationship. Likewise, the relationship rule can have a directional relationship type indicative of the direction of the relationship relative to the CI types included in the rule. Alternatively, the direction can be described outside of the relationship type or can be inferred based on the ordering of the CI types in the relationship rule.

The system 300 can govern data being stored in the CMDB 302 using the more, fewer, or a different combination of modules and components than that described herein. In an example, the relationship module 308 can determine whether relationships between CIs associated with the payload are consistent with the relationship rules before the identification module 304 determines whether CIs associated with the payload are already stored or represented in the CMDB 302. Alternatively, the relationship module 308 can determine whether relationships between CIs associated with the payload are consistent with the relationship rules after the identification module 304 determines whether the CIs associated with the payload are already stored in the CMDB 302 and before the reconciliation module 306 determines whether a data source associated with the payload has authority to store data in the CMDB 302. In an example, the relationship module 308 can determine whether relationships between CIs associated with the payload are consistent with the relationship rules prior to the reconciliation module 306 determines whether a data source associated with the payload has authority to store data in the CMDB 302. Alternatively, the relationship module 308 can determine whether relationships between CIs associated with the payload are consistent with the relationship rules after the reconciliation module 306 determines whether a data source associated with the payload has authority to store data in the CMDB 302 and before the identification module 304 determines whether the CIs associated with the payload are already stored in the CMDB 302. In some implementations, the system 300 can omit one or more of the identification module 304 and the reconciliation module 306.

The system 300 can include one or more scripts (e.g., that can be called business rules) configured to govern data being stored in the CMDB 302. For example, the script can be a server-side script (e.g., a script that is run on an application node in datacenter, such as the application node 114 in datacenter 108) that can be configured to run in response to a request to add data to the CMDB 302. For example, the script can be configured to run when a request is made to store CIs associated with the payload in the CMDB 302. In some examples, the script can compare relationships between CIs associated with the payload with the relationship rules. In some examples, the script can modify a relationship between two CIs that is inconsistent with the relationship rules. In some implementations, the script can notify an administrator or other user that a relationship between two CIs associated with the payload is inconsistent with the relationship rules. In some examples, the script can modify the relationship that is inconsistent with the relationship rules and notify the administrator or other user that the relationship was modified.

The relationship module 308 can be configured to govern data previously stored or already existing in the CMDB 302. For example, the system 300 can be configured to run a CMDB health monitor process to check that data already in the CMDB 302 adheres to the requirements provided by, e.g., relationship module 308 and/or whitelist table 310. In some implementations, a CMDB health monitor process can include a job that is executed periodically, for example, nightly, or other suitable period. The CMDB health monitor process can include executing or performing a CMDB search process. The CMDB search process can be: a job that runs on demand (e.g., in response to a request from an administrator); a scheduled job that rights nightly, or other suitable frequency; other suitable job, or combinations thereof. The CMDB search process can be configured to scan or search the CMDB 302 to identify related CIs (e.g., two CIs that have a relationship between the two CIs or more than two CIs that have relationships between the more than two CIs). The CMDB health monitor process can, for example, communicate CI pairs (e.g., two related CIs) identified by the CMDB search process to the relationship module 308.

In some implementations, the relationship module 308 can determine whether a relationship between two CIs associated with a CI pair is consistent with a rule relationship type associated with a relationship record stored in the whitelist table 310. The relationship module 308 can thus determine whether the relationship is consistent with a relationship rule. When the relationship module 308 determines the relationship is consistent with a rule relationship type associated with a relationship record stored in the whitelist table 310, the relationship module 308 can continue on to another CI pair. In some implementations, the relationship module 308 can update an attribute associated with the two CIs associated with the CI pair. The attribute can indicate that the two CIs have a relationship that is consistent with the relationship rules. The attribute can indicate to the CMDB health monitor process, during a subsequent search of the CMDB 302, that the CI pair does not need to be sent to the relationship module 308 (e.g., in such an implementation, the CMDB search process may only return new or modified relationships or those relationships including new or modified CIs). Alternatively, the relationship module 308 can store a record in a table indicating that the relationship between the two CIs is consistent with the relationship rules. The CMDB health monitor process can be configured to cross reference identified CI pairs with CI pairs associated with the table. The CMDB health monitor process can be configured to communicate identified CI pairs to relationship module 308 that are not associated with the table.

When the relationship module 308 determines the relationship is inconsistent with the relationship rules, the relationship module 308 (e.g., via the CMDB health monitor process) can generate a notification indicating the relationship between the two CIs is inconsistent with the relationship rules, such as described above. An administrator or user associated with the computing system 100 can respond to the notification by remediating the inconsistent relationship by, for example, creating a relationship between the two CIs that is consistent with the relationship rules or by taking other suitable remedial action. In some examples, the CMDB health monitor process can generate notifications, which for example, may take the form of tasks generated in an information technology service management (ITSM) system. In another example, the CMDB health monitor process can generate a report that includes CIs having relationships that are inconsistent with the relationship rules. The CMDB health monitor can display the report on a health dashboard.

Figure 7:
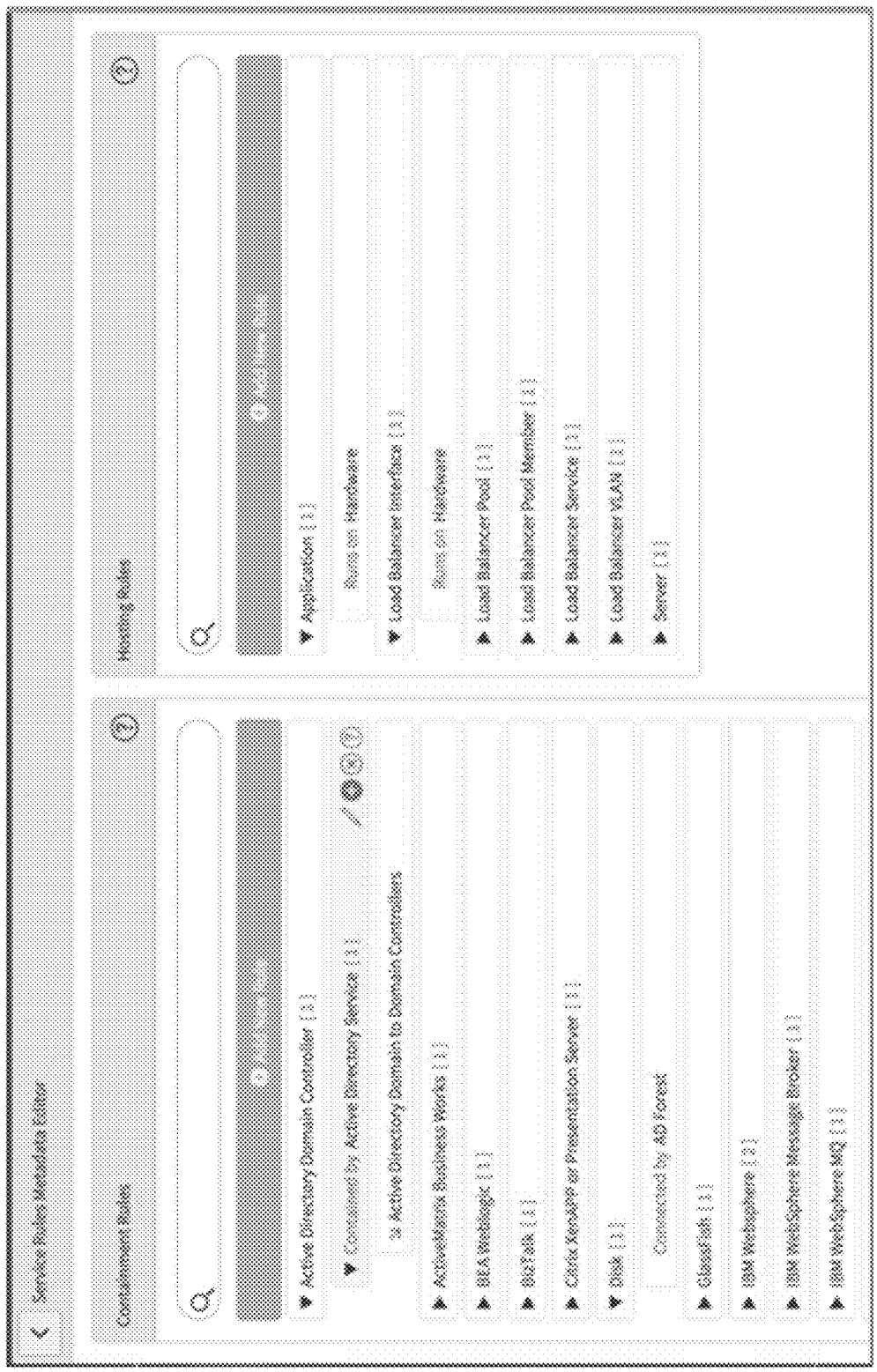
FIG. 7 is an example of web page include a user input application.

In some implementations, a user input application, such as the one previously described, can include a relationship editor, a dependency view associated with a business service management map application, other suitable applications for managing relationships in the CMDB, or combinations thereof. The user input application can be configured to receive relationship input from a user. FIG. 7 generally illustrates an example web page including a user input application for viewing and creating hosting and containment rules. The web page including the user input application can be sent to a client, such as client 104, having a user interface, such as user interface 220, which can be used to render the web page for display to the user and receive input from the user. The user interface can, for example, receive input from a user regarding information about CIs to be stored in the CMDB 302. The user can use the user input application to create relationships between the CIs. The user input application can, for example, be used to create relationships between CIs the user previously created, to create relationships between CIs previously stored in the CMDB 302, to modify relationships between CIs in the CMDB 302, or combinations thereof.

The user input application can allow the user to select or input two CI identifiers. For example, a user can select two CIs from the CMDB 302, input CI identification numbers associated with CIs stored in the CMDB 302, other suitable selections or inputs, or combinations thereof. The user input application can be configured to provide the user with suggested relationships based on the selected CIs or the user input application can receive relationships from the user. For example, the user input application can communicate the selected CIs to the relationship module 308. The relationship module 308 can identify relationship records in the whitelist table 310 having a rule CI type corresponding to a CI type associated with a first selected CI and a rule CI type corresponding to a CI type associated with a second selected CI. As described above, the relationship module 308 can identify rule relationship types associated with identified relationship records. The relationship module 308 can provide the identified rule relationship types to the relationship editor. The user input application can provide suggested relationships, to the user. By providing suggested relationships that are based on the relationship rules to the user, the relationship module 308 can prevent relationships that are inconsistent with the relationship rules from being stored in the CMDB 302. The user can then select one of the suggested relationships. In this manner, input from the user input application is consistent with the relationship rules (e.g., because the selected relationship is one of the suggested relationships which are based on the relationship rules).

The relationship module 308 can be configured to apply relationship rules to one or more CIs, for example, one or more associated with a payload, already stored in the CMDB 302, or combinations of CIs associated with the payload and the CMDB 302. For example, the relationship module 308 can identify CIs having CI types that correspond to rule CI types associated with a relationship record stored in the whitelist table 310. In one example, the relationship module 308 can identify a first CI having a CI type corresponding to a first rule CI type associated with a relationship record. The first CI can be associated with the payload or stored in the CMDB 302. The relationship module 308 can determine whether the first CI is related to another CI, for example a second CI.

The second CI can be associated with the payload or stored in the CMDB 302. The relationship module 308 can determine whether the first CI is related to another CI (e.g., the second CI) based on a relationship attribute associated with the first CI, as described above. The relationship module 308 can determine whether a CI type (e.g., a second CI type) associated with the second CI corresponds to a second rule CI type associated with the relationship record. When the relationship module 308 determines the second CI type corresponds to the second rule CI type, the relationship module 308 can determine whether a relationship associated with the first CI and the second CI is consistent with a rule relationship type associated with the relationship record, as described above.

When the relationship module 308 determines that relationship is inconsistent with the rule relationship type, the relationship module 308 can generate a notification indicating that the relationship associated with the first CI and the second CI is inconsistent with the relationship rules, as described above. An administrator can respond to the notification by taking remedial action to address the inconsistent relationship, as described above. In another example, the relationship module 308 can identify two or more CIs having CI types corresponding to rule CI types associated with a relationship record. The two or more CIs can be associated with the payload, stored in the CMDB 302, or a combination of CIs associated with the payload and the CMDB 302. The relationship module 308 can determine whether relationships associated with the two or more CIs are consistent with rule relationship types associated with the relationship record. The relationship module 308 can proceed as described above.

Figure 5:
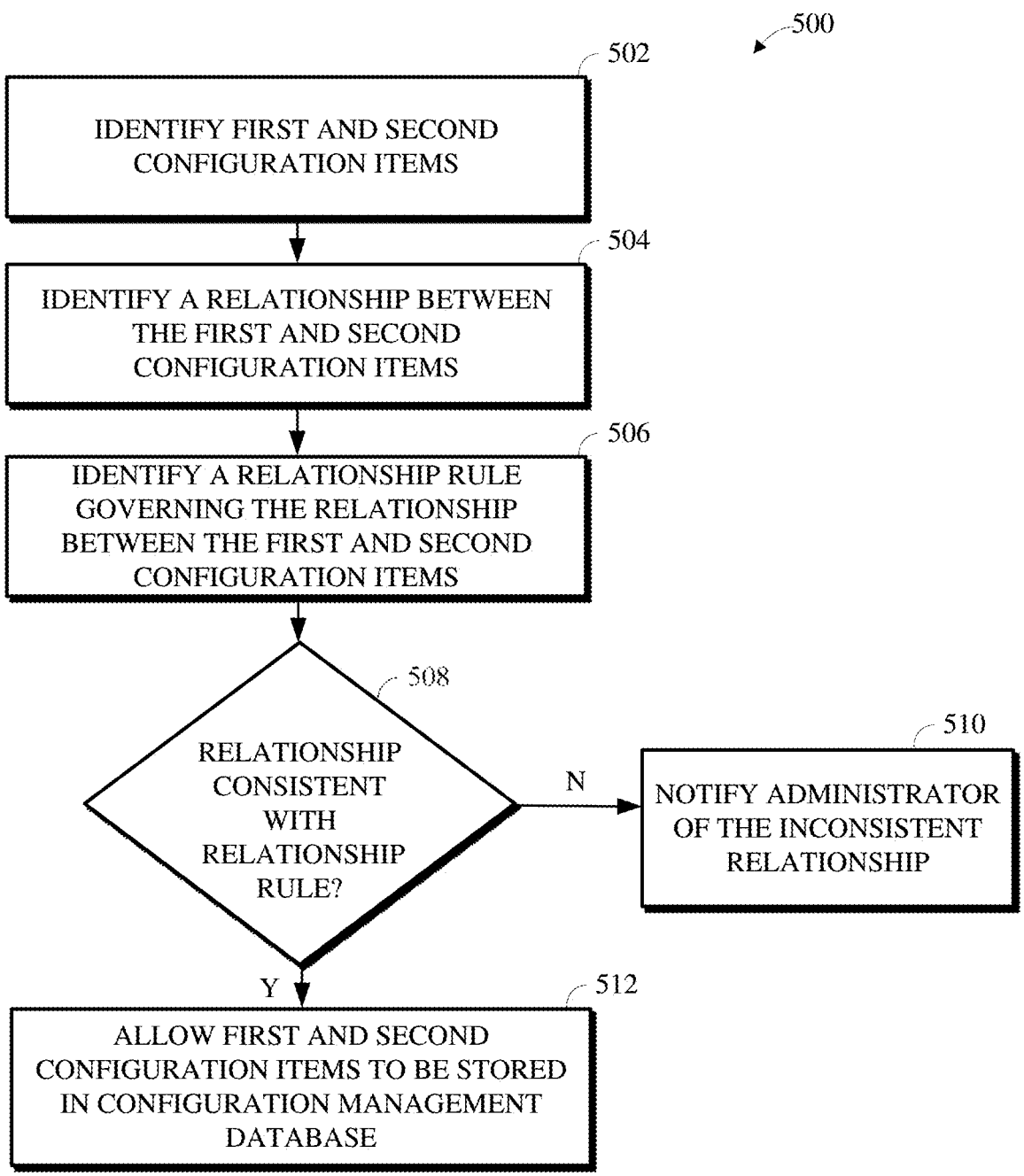
FIG. 5 is a flowchart illustrating an example of a technique for governing data in a configuration management database.

FIG. 5 is a flowchart illustrating an example of a technique 500 for governing data in a configuration management database ("CMDB") associated with an electronic computing and communications system, such as the system 100 as generally illustrated in FIG. 1. In some implementations, a technique 500 can be executed using computing devices, such as the systems, modules, and devices described with respect to FIGS. 1, 2, and 3, including system 300. For example, the technique 500 can be implemented using the relationship module 308 of FIG. 3. In some implementations, the technique 500 can be performed, for example, by executing a machine-readable program or other computer-executable instructions, such as instructions or programs described according to JavaScript, C, or other such instructions. The steps, or operations, of the technique 500 or any other method, process, or algorithm described in connection with the implementations disclosed herein can be implemented directly in hardware, firmware, software executed by hardware, circuitry, or a combination thereof.

At operation 502, the technique 500 identifies a first configuration item and a second configuration item. For example, as described above, the relationship module 308 can identify a first configuration item and a second configuration item. The identification of the configuration items ("CIs") can include receiving the CIs such as from a data source. In an example, the relationship module 308 can receive a first CI and a second CI of a plurality of CIs. The plurality of CIs can be associated with a payload from a data source. Additionally, or alternatively, the relationship module 308 can identify a first CI and a second CI stored in the CMDB 302. At operation 504, the technique 500 identifies a relationship between the first configuration item and the second configuration item. For example, as described above, the relationship module 308 can determine, based on a relationship attribute associated with the first CI and a relationship attribute associated with the second CI, a relationship between the first and second CIs At operation 506, the technique 500 identifies a relationship rule governing the relationship between the first and second configuration items. For example, as described above, the relationship module 308 can identify relationship records associated with the whitelist table 310 having a rule CI type corresponding to a first CI type associated with the first CI and a rule CI type corresponding to a second CI type associated with the second CI, and a rule relationship type. At operation 508, the technique 500 determines whether the relationship between the first and second CIs is consistent with the relationship rule. For example, as described above, the relationship module 308 can determine whether the relationship between the first and second CIs is consistent with the relationship rule based on a determination of whether the first CI type is consistent with the first rule CI type, the second CI type is consistent with the second rule CI type, and the relationship between the first and second CIs is consistent with the rule relationship type. When the relationship module 308 determines the relationship between the first and second CIs is not consistent with the relationship rule, the technique 500 continues at 510. When the relationship module 308 determines that the relationship between the first and second CIs is consistent with the relationship rule, the technique continues at 512.

At operation 510, the technique 500 notifies an administrator associated with the computing system 100 that the relationship between the first configuration item and the second configuration item is inconsistent with the relationship rules. For example, as described above, the relationship module 308 can generate a notification indicating that the relationship between the first and second CIs is inconsistent with the relationship rules. At operation 512, the technique 500 allows the first configuration item and the second configuration item to be stored in the CMDB. For example, such as described above, the relationship module 308 can allow the first and second CIs to be stored in the CMDB 302.

Although the technique 500 is shown as a series of operations for clarity, implementations of the technique 500 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted. In some examples, operation 510 may include logging an inconsistent relationship instead of or in addition to notifying an administrator. In some examples, additional operations can be added for applying identification rules to CIs and reconciliation rules to CIs, such as described above with respect to identification module 304 and reconciliation module 306. In some examples, operation 506 can include applying all or some of the relationship rules in whitelist table 310 to the identified CIs, and operation 508 can include determining whether the relationship between the CIs is consistent with the relationship rule by comparing the CI types of the CIs with the rule CI types of the relationship rule and by comparing the relationship type of the CIs and the relationship type of the relationship rule.

Figure 6:
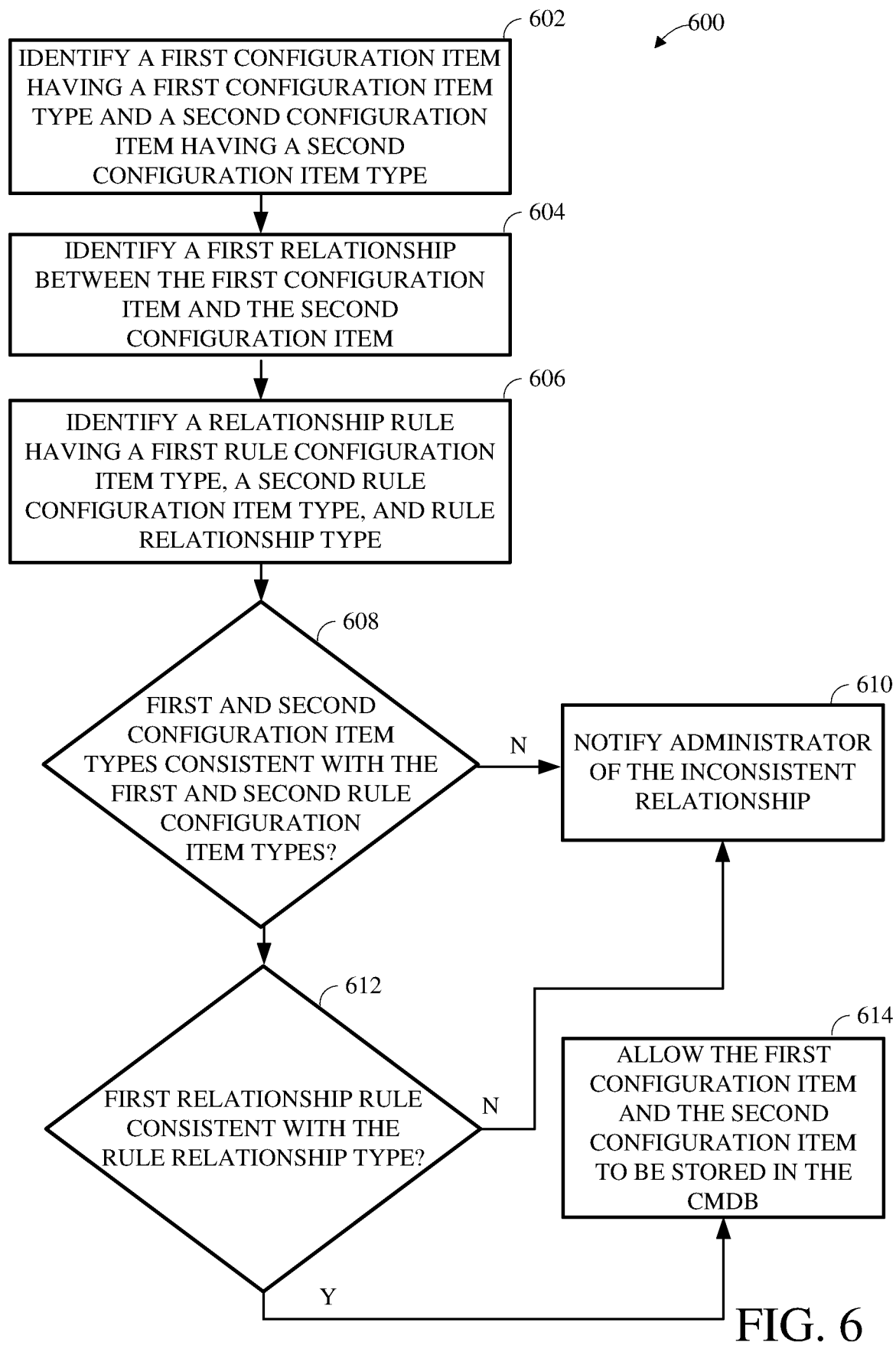
FIG. 6 is a flowchart illustrating another example of a technique for governing data in a configuration management database.

FIG. 6 is a flowchart illustrating an example of a technique 600 for governing data in a configuration management database ("CMDB") associated with an electronic computing and communications system, such as the system 100 as generally illustrated in FIG. 1. In some implementations, a technique 600 can be executed using computing devices, such as the systems, modules, and devices described with respect to FIGS. 1, 2, and 3, including system 300. For example, the technique 600 can be implemented using the relationship module 308 of FIG. 3. In some implementations, the technique 600 can be performed, for example, by executing a machine-readable program or other computer-executable instructions, such as instructions or programs described according to JavaScript, C, or other such instructions. The steps, or operations, of the technique 600 or any other method, process, or algorithm described in connection with the implementations disclosed herein can be implemented directly in hardware, firmware, software executed by hardware, circuitry, or a combination thereof.

At operation 602, the technique 600 identifies a first configuration item having a first configuration item type and a second configuration item having a second configuration item type. For example, as described above, the relationship module 308 can identify a first configuration item and a second configuration item. The identification of the configuration items ("CIs") can include receiving the CIs such as from a data source. In an example, the relationship module 308 can receive a first CI and a second CI of a plurality of CIs. The plurality of CIs can be associated with a payload from a data source. Additionally, or alternatively, the relationship module 308 can identify a first CI and a second CI stored in the CMDB 302. At operation 604, the technique 600 identifies a first relationship between the first configuration item and the second configuration item. For example, as described above, the relationship module 308 can determine, based on a relationship type associated with the first CI and/or the second CI, a first relationship between the first and second CIs.

At operation 606, the technique 600 identifies a relationship rule having a first rule configuration item type, a second rule configuration item type, and a rule relationship type. For example, as described above, the relationship module 308 can identify relationship records associated with the whitelist table 310 having a rule CI type corresponding to the first CI type and a rule CI type corresponding to the second CI type, and a rule relationship type. At operation 608, the technique 600 determines whether the first configuration item type and the second configuration item type are consistent with the first rule configuration item type and the second rule configuration item type. For example, as described above, the relationship module 308 can determine whether the first configuration item type is consistent with the first rule configuration item type and whether the second configuration item type is consistent with the second rule configuration item type. When the relationship module 308 determines that the first configuration item type is not consistent with the first rule configuration item type or that the second configuration item type is not consistent with the second rule configuration item type, the technique 600 continues at 610. When the relationship module 308 determines that the first configuration item type is consistent with the first rule configuration item type and that the second configuration item type is consistent with the second rule configuration item type, the technique continues at 612.

At operation 610, the technique 600 notifies an administrator associated with the computing system 100 that the relationship between the first configuration item and the second configuration item is inconsistent with the relationship rules. For example, as described above, the relationship module 308 can generate a notification indicating that the relationship between the first and second CIs is inconsistent with the relationship rules. The relationship module 308 can prevent the first and second CIs from being stored in the CMDB 302.

At operation 612, the technique determines whether the first relationship is consistent with the rule relationship type. For example, as described above, the relationship module 308 can compare the first relationship to the rule relationship type. When the relationship module 308 determines the first relationship is not consistent with the rule relationship type, the technique 600 continues at operation 610. When the relationship module 308 determines that the first relationship is consistent with the rule relationship type, the technique continues at operation 614.

At operation 614, the technique 600 allows the first configuration item and the second configuration item to be stored in the CMDB. For example, such as described above, the relationship module 308 can allow the first and second CIs to be stored in the CMDB 302.

Although the technique 600 is shown as a series of operations for clarity, implementations of the technique 600 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted. In some examples, operation 610 may include logging an inconsistent relationship instead of or in addition to notifying an administrator. In some examples, additional operations can be added for applying identification rules to CIs and reconciliation rules to CIs, such as described above with respect to identification module 304 and reconciliation module 306. In some examples, operation 606 can include applying all or some of the relationship rules in whitelist table 310 to the identified CIs.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array, (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC) or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for configuration management database governance, the method comprising:
   receiving, via a processor, a first payload of data records associated with respective components of a computing network from a first data source and a second payload of data records associated with the respective components of the computer network from a second data source different than the first data source;
   identifying, via the processor, a relationship between a first component of the computing network and a second component of the computing network based on the first payload of data records and the second payload of data records;
   identifying, via the processor, a relationship rule governing storage of the relationship between the first component and the second component in a configuration management database (CMDB);
   determining, via the processor, that the relationship between the first component and the second component is inconsistent with the relationship rule;
   preventing, via the processor, storage of one or more data records of the first payload of data records associated with the first component or the second component, one or more data records of the second payload of data records associated with the first component or the second component, and the relationship between the first component and the second component in the CMDB in response to determining that the relationship between the first component and the second component is inconsistent with the relationship rule;
   remediating, via the processor, the relationship between the first component and the second component such that the relationship is consistent with the relationship rule; and
   storing, via the processor, the one or more data records of the first payload of data records, the one or more data records of the second payload of data records, and the remediated relationship in the CMDB after remediating the relationship between the first component and the second component to be consistent with the relationship rule, wherein the one or more data records of the first payload of data records and the one or more data records of the second payload of data records are stored as respective configuration items in the CMDB.

2. The method of claim 1, comprising determining that the first data source or the second data source has authority to update the CMDB based on the relationship rule.

3. The method of claim 1, wherein the first data source, the second data source, or both, comprise a discovery application, a configuration management database migration application, a user input application, or any combination thereof.

4. The method of claim 1, wherein storing the one or more data records of the first payload of data records and the one or more data records of the second payload of data records in the CMDB includes allowing the one or more data records of the first payload of data records and the one or more data records of the second payload of data records to remain stored in the CMDB.

5. The method of claim 1, wherein identifying a relationship rule includes identifying a relationship rule that includes a first rule configuration item type corresponding to a first configuration item type associated with the first component and a second rule configuration item type corresponding to a second configuration item type associated with the second component.

6. The method of claim 1, comprising notifying an administrator that the relationship between the first component and the second component is inconsistent with the relationship rule in response to determining that the relationship between the first component and the second component is inconsistent with the relationship rule.

7. A system for configuration management database governance, the system comprising:
   a server device including a processor and a memory, the memory including instructions executable by the processor to:
      receive a first record associated with a first component of a computing network from a first data source and a second of the computing network from a second data source different than the first data source, wherein the first component is associated with a first configuration item type and the second component is associated with a second configuration item type;
      identify a relationship between the first component and the second component based on the first record and the second record, the relationship having a first relationship type;
      identify a relationship rule governing storage of the relationship between the first component and the second component in a configuration management database (CMDB), the relationship rule including a first rule configuration item type, a second rule configuration item type, and a rule relationship type associated with the first rule configuration item type and the second rule configuration item type;
      determine whether the relationship between the first component and the second component is consistent with the relationship rule based on a comparison of (a) the first and second configuration item types and the first and second rule configuration item types and (b) the rule relationship type and the first relationship type; and
      in response to a determination that the relationship between the first component and the second component is inconsistent with the relationship rule:
         prevent storage of the first record, the second record, and the relationship between the first component and the second component in the CMDB;
         remediate the relationship between the first component and the second component such that the relationship is consistent with the relationship rule; and
         allow the first record to be stored as a first configuration item in the CMDB, the second record to be stored as a second configuration item in the CMDB, and the remediated relationship to be stored in the CMDB after remediating the relationship between the first component and the second component to be consistent with the relationship rule.

8. The system of claim 7, wherein the instructions comprise instructions executable by the processor to determine that the first data source or the second data source has authority to update the CMDB based on the relationship rule.

9. The system of claim 8, wherein the instructions to identify the relationship rule are executed in response to determining that the first data source or the second data source has authority to update the CMDB.

10. The system of claim 9, wherein the first component is associated with a first payload that includes a first plurality of records associated with a first plurality of components and the second component is associated with a second payload that includes a second plurality of records associated with a second plurality of components.

11. The system of claim 10, wherein the first data source or the second data source comprises a discovery application, a CMDB migration application, or a user input application, or any combination thereof.

12. The system of claim 7, wherein the instructions to allow the first record to be stored as the first configuration item in the CMDB and the second record to be stored as the second configuration item in the CMDB include allowing at least one of the first configuration item and the second configuration item to remain stored in the CMDB.

13. The system of claim 7, wherein the instructions comprise instructions executable by the processor to notify an administrator that the relationship is inconsistent with the relationship rule in response to the determination that the relationship is inconsistent with the relationship rule.

14. A non-transitory computer-readable storage medium, comprising executable instructions that, when executed by a processor, facilitate performance of operations, comprising:
receiving a first record associated with a first component of a computing network from a first data source and a second component of the computer network from a second data source different than the first data source;
identifying a relationship between the first component and the second component based on the first record and the second record;
identifying a relationship rule governing storage of the relationship between the first component and the second component in a configuration management database (CMDB);
determining that the relationship between the first component and the second component is inconsistent with the relationship rule;
preventing storage of the first record, the second record, and the relationship between the first component and the second component in the CMDB in response to determining that the relationship between the first component and the second component is inconsistent with the relationship rule;
remediating the relationship between the first component and the second component such that the relationship is consistent with the relationship rule; and
storing the first record as a first configuration item in the CMDB, the second record as a second configuration item in the CMDB, and the remediated relationship in the CMDB after remediating the relationship between the first component and the second component to be consistent with the relationship rule.

15. The non-transitory computer-readable storage medium of claim 14, comprising determining that the first data source or the second data source has authority to update the CMDB based on the relationship rule.

16. The non-transitory computer-readable storage medium of claim 14, wherein the first record is associated with a first payload from the first data source and the second record is associated with a second payload from the second data source, and wherein the first data source, the second data source, or both, comprise a discovery application, a configuration management database migration application, a user input application, or any combination thereof.

17. The non-transitory computer-readable storage medium of claim 14, wherein storing the first record as the first configuration item in the CMDB and the second record as the second configuration item in the CMDB includes allowing the first configuration item and the second configuration item to remain stored in the CMDB.

18. The non-transitory computer-readable storage medium of claim 14, wherein identifying a relationship rule includes identifying a relationship rule that includes a first rule configuration item type corresponding to a first configuration item type associated with the first component and a second rule configuration item type corresponding to a second configuration item type associated with the second component.

19. The non-transitory computer-readable storage medium of claim 14, comprising notifying an administrator that the relationship between the first component and the second component is inconsistent with the relationship rule in response to determining that the relationship between the first component and the second component is inconsistent with the relationship rule.

* * * * *